United States Patent Office 2,789,141
Patented Apr. 16, 1957

2,789,141

PRODUCTION OF ALPHA-DIKETONES

Herbert Friederich, Worms, Heinrich Laib, Heddesheim, and Erich Henkel, Ludwigshafen (Rhine), Germany, assignors to Badische Anilin- & Soda-Fabrik Aktiengesellschaft, Ludwigshafen (Rhine), Germany No Drawing. Application August 9, 1954, Serial No. 448,758

Claims priority, application Germany September 3, 1953

4 Claims. (Cl. 260—593)

This invention relates to a process for the production of alpha-diketones.

We have found that alpha-diketones are obtained by treating dialkyl-2-butine-1.4-diols at raised temperatures, preferably in the presence of salts of metals of the 1st and 2nd sub-groups of the periodic system, with aqueous solutions of strong acids.

In the case of hexine-(3)-diol-(2.5), i. e. 1.4-dimethyl-2-butine-1.4-diol, the reaction may be formulated as follows:

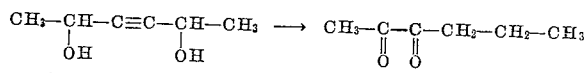

The 1.4-dialkyl-2-butine-1.4-diols suitable as initial materials are readily accessible by reaction of acetylene with 2 molecules of an aliphatic aldehyde containing at least 2 carbon atoms. Instead of the 1.4-dimethyl-2-butine-1.4-diol formulated above, there can be used for example the 1.4-diethyl-, 1.4-dipropyl-, 1.4-dihexyl- or the 1-methyl-4-pentyl-2-butine-1.4-diol which yield the corresponding alpha-diketones in a similar way.

In order to carry out the process, the diols are heated for example with aqueous sulfuric, hydrochloric or phosphoric acid at 100° to 150° C., preferably in the presence of small amounts of mercury or copper salts, for example of from 0.05 to 5% with reference to the butinediol. The procedure may also be that only aqueous solutions of mercury or copper salts are allowed to act on the diol with the addition of very small amounts of said acids, the reaction then being continued by the addition of larger amounts of the acid.

The simplest method of carrying out the reaction is by boiling the reaction mixture under reflux. In many cases it is preferable to work in pressure-tight vessels in order to be able to employ higher temperatures. The process may also be carried out continuously, for example by leading the diol continuously through a heated pressure tube together with the aqueous acid and the metal salts.

The alpha-diketones formed can be recovered from the reaction mixture by steam distillation, by azeotropic distillation with auxiliary liquids or by extraction with a selective solvent. The unreacted diol can be reacted again.

It is surprising that under the said conditions the 1.4-dialkyl-3-butine-1.4-diols do not undergo rearrangement to form gamma-diketones (for example CH₃—CO—CH₂—CH₂—CO—CH₃) but form unsymmetrical alpha-diketones.

The alpha-diketones readily obtainable according to this invention are valuable intermediate products for dyestuffs, pharmaceutical products and perfumes.

The following examples will further illustrate this invention but the invention is not restricted to these examples. The parts are by weight.

Example 1

570 parts of hexine-(3)-diol-(2.5) are heated with 1000 parts of water after the addition of 10 parts of mercury sulfate and 1 part of 80% phosphoric acid for 6 hours at 120° to 130° C. in a stirring vessel provided with a reflux condenser. 46 parts of 80% phosphoric acid are then added and the whole heated for another 4 hours at 120° to 140° C. The hexanedione-(2.3) formed is then expelled by blowing in steam. It is lighter than water and may readily be separated from the water distilled with it. There are thus obtained about 300 parts of crude diketone which yield 270 parts of pure hexanedione-(2.3) having the boiling point 129° to 130° C. at 750 Torr. by fractional distillation.

By neutralising the acid solution remaining in the reaction vessel with caustic soda solution, 130 parts of unreacted hexinediol are recovered. The yield of alpha-diketone thus amounts to 61.5% of the theoretical yield based on diol reacted.

Example 2

545 parts of a commercial about 55% aqueous solution of hexine-(3)-diol-(2.5) are boiled with 1000 parts of 48% sulfuric acid and 5 parts of mercury sulfate for 8 hours in a circulatory apparatus in which the vapours of water and alpha-diketone distilling over are cooled and the condensed water, after separating the alpha-diketone in a siphon, continuously returned to the reaction vessel. 120 parts of hexanedione-(2.3) are obtained. By working up the residue in the manner described in Example 1, 36 parts of hexinediol are recovered. The yield of hexanedione-(2.3) is thus 52% of the theoretical yield.

Example 3

230 parts of a 42.5% aqueous solution of hexine-(3)-diol-(2.5) are boiled under reflux for 6 hours with 200 parts of 10% hydrochloric acid with the addition of 2 parts of mercuric sulfate and 1 part of cupric chloride at a bath temperature of 130° to 140° C. Steam is then blown through the reaction mixture. 25 parts of hexanedione-(2.3) can be recovered from the distillate by simple separation in a separating funnel and a further 5 parts of the alpha-diketone can be recovered by extracting the aqueous layer with benzene.

Example 4

A mixture consisting of 30 parts of hexine-(3)-diol-(2.5), 1000 parts of water, 143 parts of 80% phosphoric acid and 1.5 parts of mercury sulfate is heated to boiling while stirring in a circulatory apparatus, the water vapour and alpha-diketone vapour which distil over being cooled and the condensed water continuously returned from the siphon to the reaction vessel. After 5 hours, a further 90 parts of hexinediol and 1.5 parts of mercury sulfate are added to the reaction mixture, and again the same addition is made every 5 hours. After 300 hours in all the supply of hexinediol is interrupted; 1.5 parts of mercury sulfate are, however, added three times each after the lapse of 5 hours. The total duration of the reaction is thus 315 hours. After this time, 5024 parts of hexanedione-(2.3) in all have been formed and removed from the siphon from time to time. The yield thus corresponds to about 88% of the theoretical yield. The 2.5-dimethyl-3-oxotetrahydrofurane formed in small quantities as a by-product can be removed from the crude product by fractional distillation and the hexanedione-(2.3) obtained in the pure state. The mercury is practically completely recovered as element.

What we claim is:

1. A process for the production of alpha-diketones of the general formula

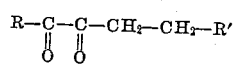

wherein R and R' stand for lower alkyl groups which comprises heating a 1.4-dialkyl-2-butine-1.4-diol of the general formula

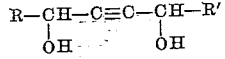

wherein R and R' have the significance defined above at from about 100° to 150° C. with an aqueous solution of a strong mineral acid selected from the group consisting of phosphoric, sulfuric and hydrochloric acids containing from about 0.05 to 5%, with reference to the diol amount, of a metal salt selected from the group consisting of mercuric and cupric salts.

2. A process for the production of alpha-diketones of the general formula

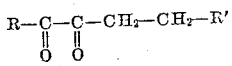

wherein R and R' stand for lower alkyl groups which comprises heating a 1.4-dialkyl-2-butine-1.4-diol of the general formula

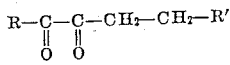

wherein R and R' have the significance defined above at from about 100° to 150° C. with an aqueous solution of a strong mineral acid selected from the group consisting of phosphoric, sulfuric and hydrochloric acids containing from about 0.05 to 5%, with reference to the diol amount, of mercuric sulfate.

3. A process for the production of alpha-diketones of the general formula

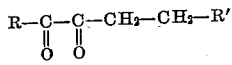

wherein R and R' stand for lower alkyl groups which comprises heating a 1.4-dialkyl-2-butine-1.4-diol of the general formula

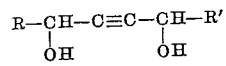

wherein R and R' have the significance defined above at from about 100° to 150° C. with an aqueous solution of a strong mineral acid selected from the group consisting of phosphoric, sulfuric and hydrochloric acids containing from about 0.05 to 5%, with reference to the diol amount, of cupric chloride.

4. A process for the production of hexene-dione-(2.3) which comprises heating hexine-(3)-diol-(2.5) with about 0.08 to 4% aqueous phosphoric acid containing about 1% mercuric sulfate at about 120 to 140° C.

References Cited in the file of this patent
FOREIGN PATENTS 903,685   France ---------------- Jan. 29, 1945